P. MIHAN.
Distilling Apparatus.
No. 28,325.
Patented May 15, 1860.
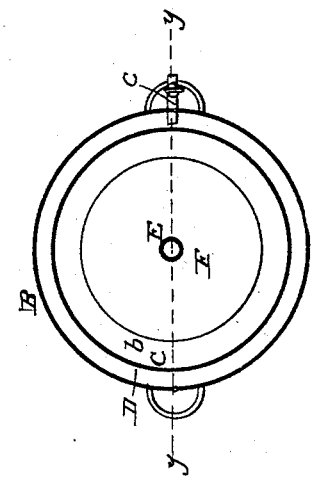
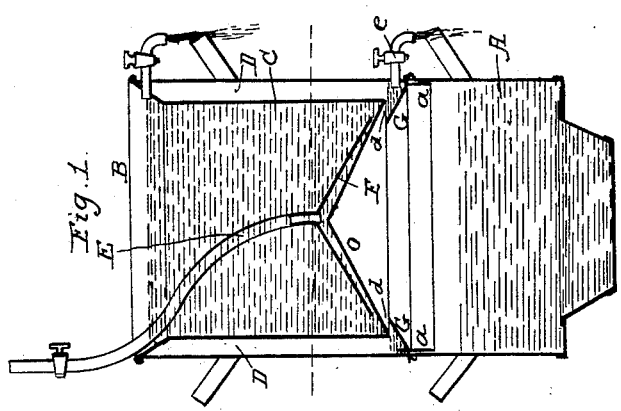

UNITED STATES PATENT OFFICE.

PATRICK MIHAN, OF BOSTON, ASSIGNOR TO HIMSELF AND MAJOR A. LANE, OF CHARLESTOWN, MASSACHUSETTS.

IMPROVEMENT IN THE CONSTRUCTION OF CONDENSERS OF STILLS.

Specification forming part of Letters Patent No. 28,325, dated May 15, 1860.

*To all whom it may concern:*

Be it known that I, PATRICK MIHAN, of Boston, in the county of Suffolk and State of Massachusetts, have invented a new and Improved Distilling Apparatus; and I do hereby declare that the following is a full, clear, and exact description of the same, reference being had to the accompanying drawings, forming a part of this specification, in which—

Figure 1 represents a vertical central section of my invention, the line $y$ $y$, Fig. 2, indicating the plane of section; Fig. 2, a horizontal section of the same, taken in the plane indicated by the line $x$ $x$, Fig. 1.

Similar letters of reference in both figures indicate corresponding parts.

This invention consists in combining an annular steam-chamber surrounding a vessel that contains cold water and the elevated conical bottom of said vessel with a conical receiving-chamber in such a manner that if said vessel is placed on a kettle containing boiling water the steam arising from the latter, by coming in contact with the conical bottom and with the cold walls of the steam-chamber, condenses and collects in the conical receiving-chamber, from which it is drawn by a suitable faucet; and it consists, also, in the arrangement of a conical mouth-piece at the end of the supply-pipe, in combination with the conical elevated bottom of the reservoir, for the purpose of spreading the cold water over all parts of said bottom, and to enable it to act with the best possible effect in condensing the steam that may come in contact with it.

To enable others skilled in the art to make and use my invention, I will proceed to describe its construction and operation with reference to the drawings.

A represents a vessel, of tinned sheet-iron or any other suitable material, made to fit into a common stove, or so arranged that it may conveniently be heated. This kettle is open on the top, and fitted into it by means of a projecting rim, $a$, is the condenser B. This condenser consists of a cold-water reservoir, C, surrounded by an annular steam-chamber, D. The bottom $b$ of the reservoir C is of an elevated conical form, and water is conducted to the same through the supply-pipe E, which terminates in an enlarged conical mouth-piece, F, so as to spread the cold water over the entire surface of the conical bottom $b$ of the reservoir. The waste water is carried off by the faucet $c$. The steam-chamber D terminates in the conical receiving-chamber G, the edge of which projects beyond the edge of the conical bottom $b$ of the reservoir, leaving an open passage, $d$, from the kettle to the steam-chamber. A faucet, $e$, serves to draw off the contents of the receiving-chamber D.

The operation is as follows: The kettle A is filled with impure water and exposed to a fire until the water boils. The steam arising from the boiling water strikes against the under side of the conical bottom $b$ of the reservoir, which latter, being cooled by being constantly in contact with the supply-water spread over it by the mouth-piece F, causes a large portion of the steam to condense and to flow down over the inclined sides of the conical bottom to the receiving-chamber G. That portion of the steam which is not condensed by coming in contact with the bottom $b$ passes up into the steam-chamber D, where it is brought in contact with the cold sides of the reservoir C, so that it condenses and flows down to the receiving-chamber G in the form of pure water. By these means a large quantity of sea-water can be distilled and rendered fit for drinking or culinary purposes with a small expenditure of fuel; but my apparatus may be used with equal advantage for freeing water or other liquids from their non-volatile impurities. Its simplicity and the trifling cost with which it can be manufactured and sold recommend the same to the public.

Having thus fully described my invention, what I claim as new, and desire to secure by Letters Patent, is—

The combination of the conical mouth-piece F of the supply-pipe E with the conical bottom $b$ of the reservoir C, substantially as and for the purpose specified.

PATRICK MIHAN.

Witnesses:
CHAS. A. TREND,
JNO. B. DEARBORN.